United States Patent
Lee et al.

(10) Patent No.: US 9,739,636 B2
(45) Date of Patent: Aug. 22, 2017

(54) CALIBRATION DEVICE AND CALIBRATION METHOD

(71) Applicant: HON HAI PRECISION INDUSTRY CO., LTD., New Taipei (TW)

(72) Inventors: Te-Hua Lee, New Taipei (TW); Ming-Chieh Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 169 days.

(21) Appl. No.: 14/855,596

(22) Filed: Sep. 16, 2015

(65) Prior Publication Data

US 2016/0084671 A1   Mar. 24, 2016

(30) Foreign Application Priority Data

Sep. 24, 2014 (CN) .......................... 2014 1 0492611

(51) Int. Cl.
*G01C 25/00* (2006.01)

(52) U.S. Cl.
CPC .................................... *G01C 25/00* (2013.01)

(58) Field of Classification Search
CPC .................................................. G01C 25/00
USPC ......... 33/228, 281, 286, 290, 296, 374–376, 33/382–383, 518, 613, 813, 823, 828, 33/832, 833, DIG. 21; 73/643, 657, 1.01
See application file for complete search history.

(56) References Cited

U.S. PATENT DOCUMENTS

| | | | |
|---|---|---|---|
| 2005/0193577 A1* | 9/2005 | Sergyeyenko | G01C 15/002 33/290 |
| 2006/0156560 A1* | 7/2006 | Lines | F41G 1/34 33/265 |
| 2006/0196062 A1* | 9/2006 | Nishibashi | B23Q 1/5462 33/502 |
| 2006/0219014 A1* | 10/2006 | Turner | G01N 21/1717 73/643 |
| 2008/0115562 A1* | 5/2008 | Haino | G01C 25/005 73/1.37 |
| 2011/0023575 A1* | 2/2011 | Al-Ali | A61B 5/02416 73/1.03 |
| 2015/0300808 A1* | 10/2015 | Osaki | G01B 11/005 33/504 |
| 2016/0334440 A1* | 11/2016 | Fertig | G01P 21/00 |

* cited by examiner

*Primary Examiner* — R. A. Smith
*Assistant Examiner* — Tania Courson
(74) *Attorney, Agent, or Firm* — Steven Reiss (57) ABSTRACT

A calibration device to calibrate precise horizontality of a light emitting element includes a retaining rack, a microprocessor, a regulating member, two driven members, and two photo sensing members. The regulating member drives the light emitting element, the two driven members are on the retaining rack, and the microprocessor controls the driven members to move linearly. The photo sensing members detect light transmitted and data as to the vertical distance between two driven members, and vertical distance between the photo sensing member and the two driven members, is stored. The microprocessor calculates the moving distance of the photo sensing members carried by the driven members based on the signals of light detected, and further calculates declination of the light emitting element. The microprocessor can adjust the orientation of light emitting element.

10 Claims, 12 Drawing Sheets

CALIBRATION DEVICE AND CALIBRATION METHOD

FIELD

The subject matter herein generally relates to a light calibration device and method.

BACKGROUND

A robot needs to monitor a pathway situation to avoid falling down or colliding with something when the robot moves. At present, a laser level gauge and a laser camera assist a robot by reading laser light to recognize the pathway situation. The laser level gauge needs to be calibrated when on the robot, but calibration by an operator who does the calibration upon his own experience of the pathway will cause deviation.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to Obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series and the like.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of non-transitory computer-readable medium include CDs, DVDs, BLU-RAY, flash memory, and hard disk drives.

Figure 1:
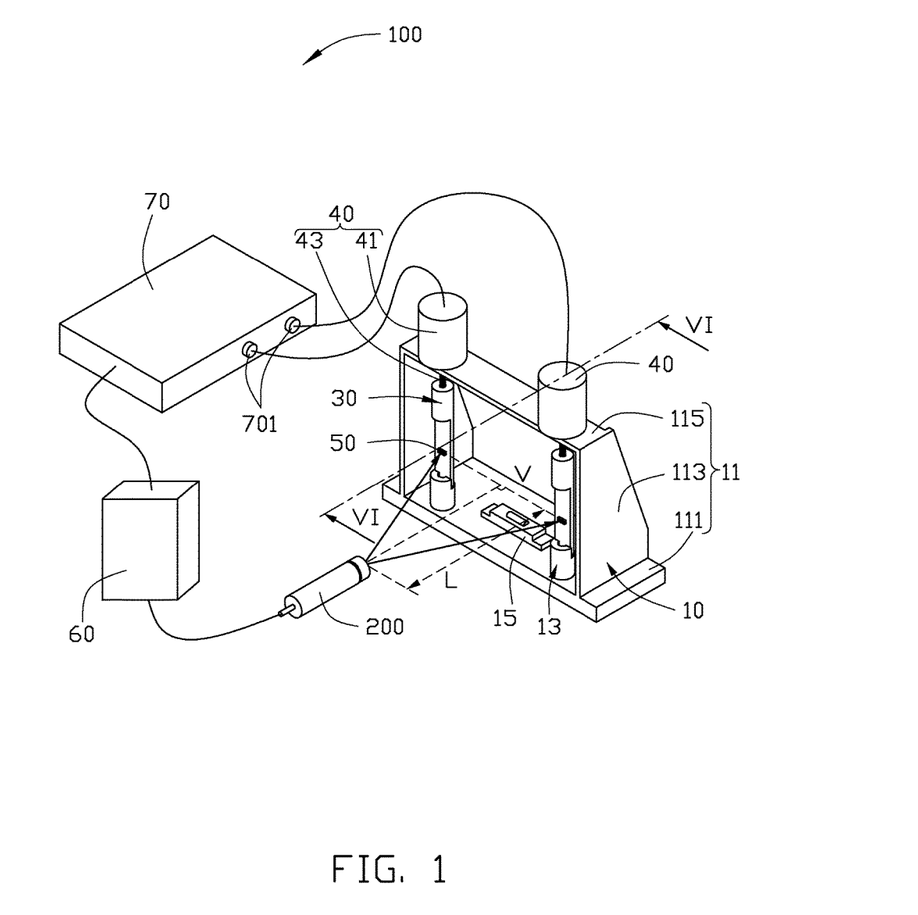
FIG. 1 is an isometric view of a laser level gauge of a calibration device of present disclosure.
Figure 2:
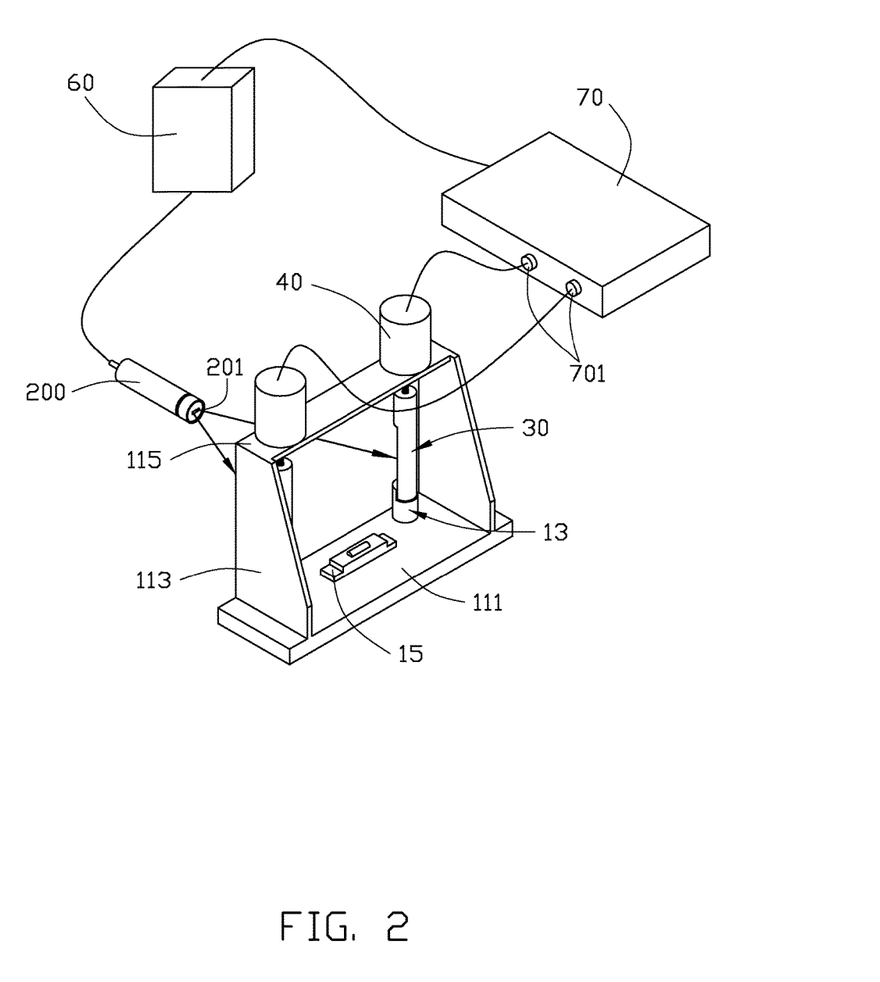
FIG. 2 is an isometric view from another angle of the calibration device of FIG. 1.

FIG. 1 is an isometric view of a laser level gauge of a calibration device of present disclosure. FIG. 2 is an isometric view from another angle of the calibration device of FIG. 1. In at least one embodiment, the calibration device 100 detects whether the laser level gauge 200. is level, and to calibrate or recalibrate the laser level gauge 200 accordingly. The calibration device 100 can be configured on a robot. The calibration device 100 comprises is retaining rack 10, two sliding members 30, two driven members 40, two photo sensing members 50, a regulating member 60, and a microprocessor 70. The two sliding members 30 are slidably mounted on the retaining rack 10. The two driven members 40 are also mounted on the retaining. rack 10 and each is connected with a sliding member 30, to trigger the sliding member 30 to slide along the retaining rack 10. The two photo sensing members 50 are mounted on the sliding members 30 and detect the light emitted by the laser level gauge 200. The regulating member 60 is coupled with the laser level gauge 200 to regulate the laser emitted by the laser level gauge 200. The microprocessor 70 is near the retaining rack 10, and is coupled with the two driven members 40, the two photo sensing members 50, and the regulating member 60. The microprocessor 70 controls the rotation of the two driven members 40 and the operation of the regulating member 60.

In at least one embodiment, a light output hole 201 is defined on one end of the laser level gauge 200, and the light emitting from the laser level gauge 200 through the light output hole 201 becomes a fan-shaped spread. In at least one embodiment, the regulating member 60 can adjust the declination of the laser level gauge 200.

Figure 3:
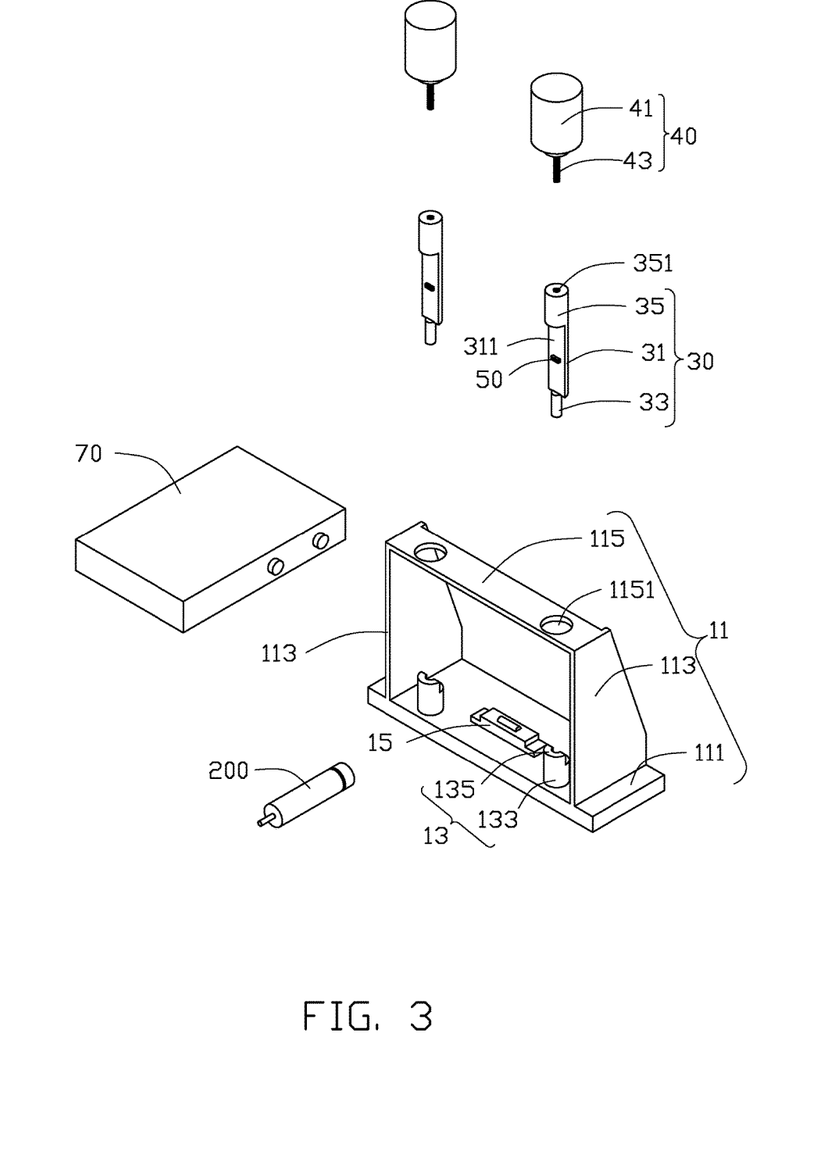
FIG. 3 is an exploded, view of the laser level gauge of the calibration device of FIG. 1.
Figure 4:
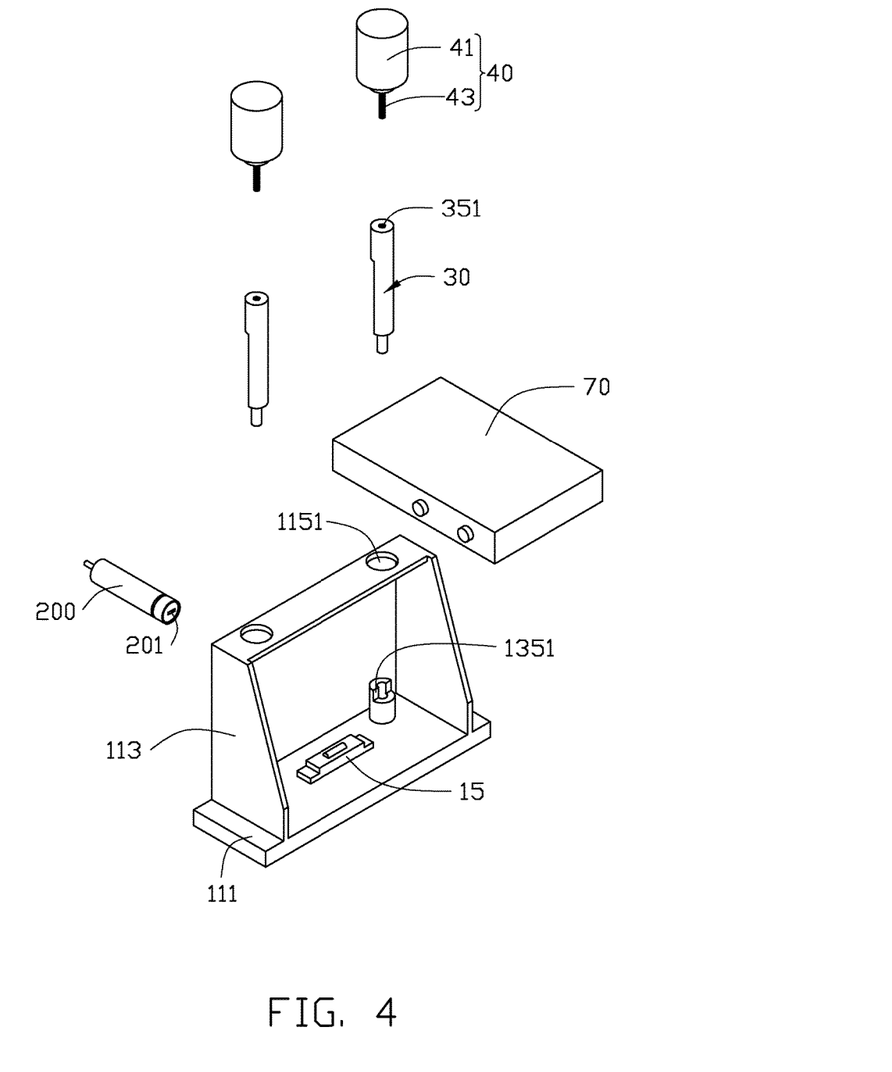
FIG. 4 is view from another angle of the exploded view of the laser level gauge of calibration device of FIG. 3.

FIG. 3 shows laser level gauge of the calibration device of FIG. 1. The retaining rack 10 comprises a retaining member 11 and two locking members 13 which are configured on the retaining member 11. In at least one embodiment, the shape of the retaining member 11 is a rectangular outline. The retaining member 11 comprises a mounting plate 111, two supporting plates 113, and an anchor plate 115. The two supporting plates 113 are vertically configured on two ends of the same side of the mounting plate 111 and are parallel with each other. The anchor plate 115 is on the other ends of two supporting plates 113, and the anchor plate 115 is perpendicular to the two supporting plates 113. Two through holes 1151 are defined on two ends of the anchor plate 115. The mounting plate 111, two supporting plates 113, and the anchor plate 115 form a rectangular frame. Two locking members 13 are both configured on the mounting plate 111 and located between the two supporting plates 113. A via 131 is defined on each locking member 13 on the same axis as the locking member 13. The locking member 131 comprises a fastening part 133 and a locking part 135 which extends from the fastening part 133. In at least one embodiment, the fastening part 133 is a hollow cylinder. One end of the fastening part 133 is configured on the mounting plate 111. The locking part 135 is a semicircular extension from the fastening part 133, and the central point of the locking part 135 is on the central axis of the locking member 133. FIG. 4 is another view of the laser level gauge of calibration device 100 of FIG. 3. The locking part 135 has two locking surfaces 1351, and the two locking surfaces 1351 are on the same plane. In at least one embodiment, a level gauge 15 is further configured on the mounting plate 111 of the retaining member 11, and the level gauge 15 is located on the middle of the mounting plate 111 to detect that the working stage which supports the retaining rack. 10 is horizontal. In other embodiment, the level gauge 15 can be eliminated.

Referring to FIG. 3, a sliding member 30 is configured on each of the two locking members 13. Each sliding member 30 comprises a mounting part 31, an extruded part 33, and a connecting part 35 which are adjacent to two ends of the mounting part 31. In at least one embodiment, the mounting part 31 is a half-cylinder. The mounting part 31 has a resistant surface 311, and the resistant surface 311 is configured near the laser level gauge 200, resisting against the two locking surfaces 1351. In at least one embodiment, the extruded part 33 is a cylinder which is configured on one end of the locking member 13 which is near the mounting member 31, and the extruded part 33 is received in the via 131 of the locking member 13. The connecting part 35 is a cylinder which is configured on the end of the locking member 11 away from the mounting member 31. A screw thread hole 351 is defined along the axis of the connecting part 35.

Figure 5:
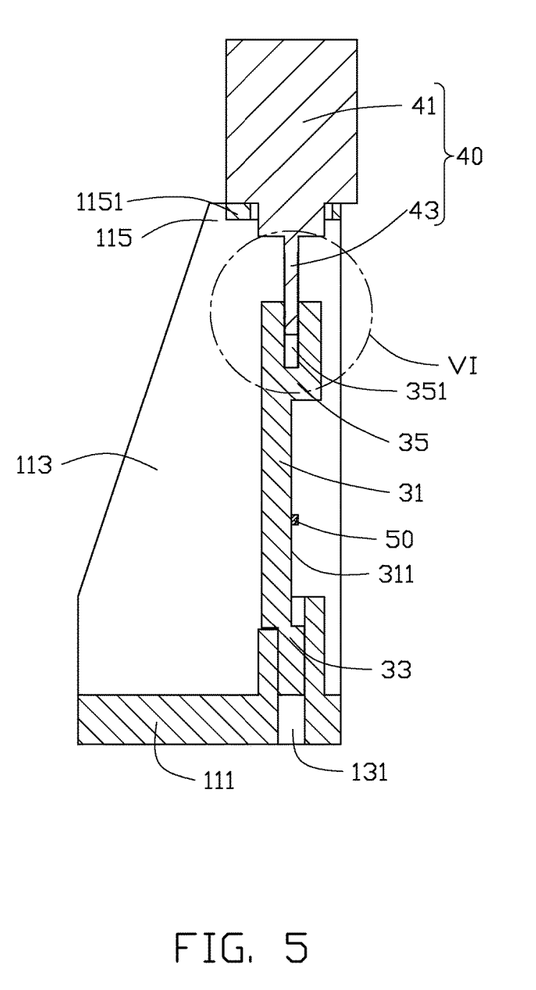
FIG. 5 shows a cross-section of the calibration device along line VI-VI of FIG. 1.
Figure 6:
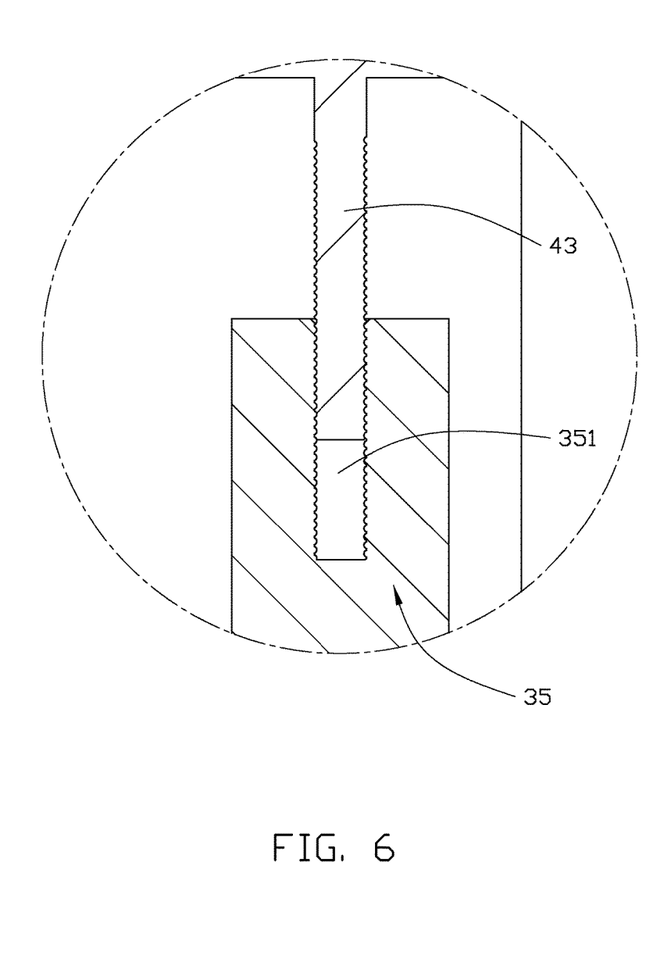
FIG. 6 shows an enlarged view of circled portion VII of the calibration device of FIG. 5.

FIG. 5 is a cross-section view of the calibration device 100 of FIG. 1. FIG. 6 is an enlarged view of part of calibration device 100. Two driven members 40 are in the holes 1151, and are fixed on the anchor plate 115. Each driven menthes 40 comprises a driven main body 41 and a drive rod 43 which is configured on the driven main body 41. The driven main body 41 of each driven member 40 is configured in the via 1151, and is fixed on the anchor plate 226. The drive rod 43 is a screwed rod. The driven lever 43 is received in the screw thread hole 351, and is screwed with the screw thread hole 351. When the driven main body 41 drives the drive rod 43 to rotate, the drive rod 43 leads the Sliding member 31 to slide. In at least one embodiment, the driven member 40 is a stepping motor.

Retelling to FIG. 2 and FIG. 3, a photo sensing member 50 is configured on each of the mounting parts 31, facing the resistant surface 311 side, and is electrically connected with microprocessor 70. Each photo sensing member 50 detects the intensity of light which is emitted from the laser level gauge 200, and the intensity signal is transformed to electrical signal by a converting circuit and is amplified by an amplifying, circuit, and then is transmitted to the microprocessor 70. In at least one embodiment, microprocessor 70 transmits pulse signals to rotate the driven member 40.

Figure 7:
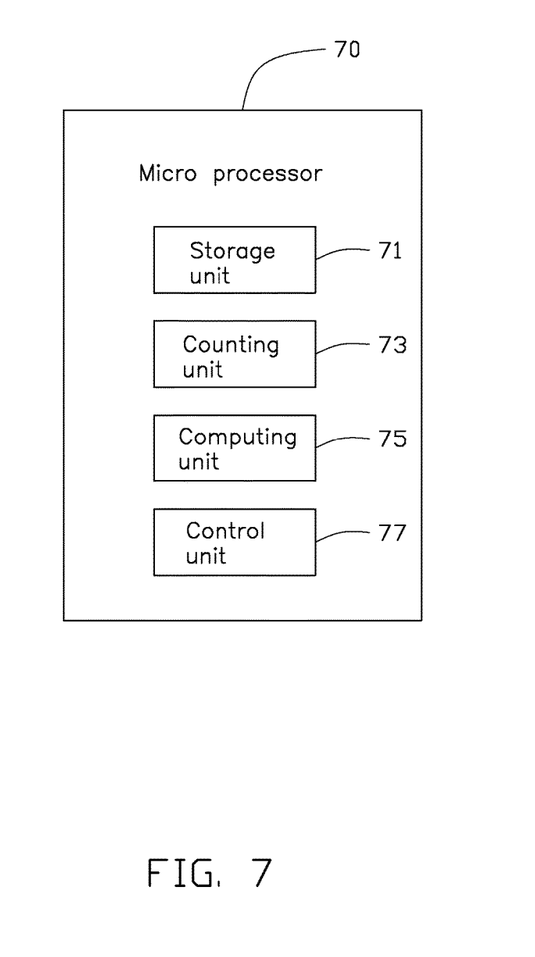
FIG. 7 is a block diagram of the signal processing module of the micro processor of the calibration device of FIG. 1.
Figure 8:
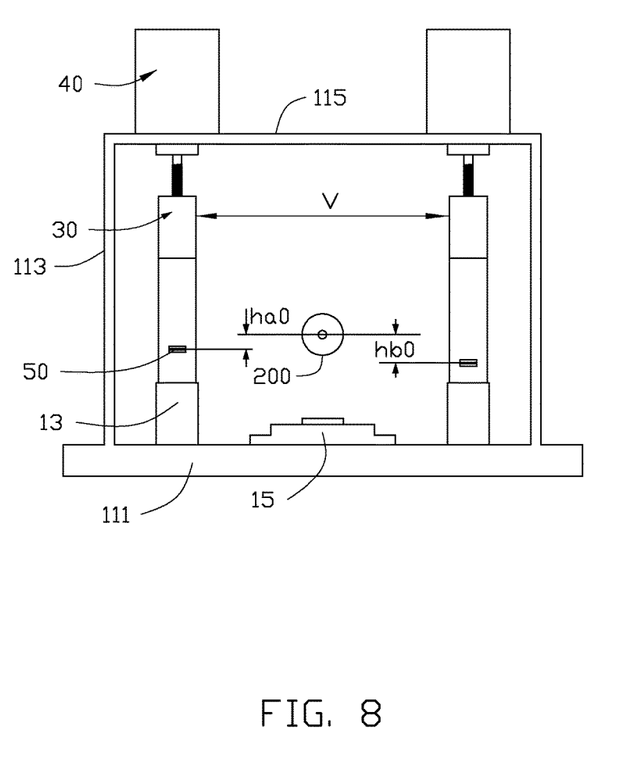
FIG. 8 is a front view of the calibration device of FIG. 1.
Figure 9:
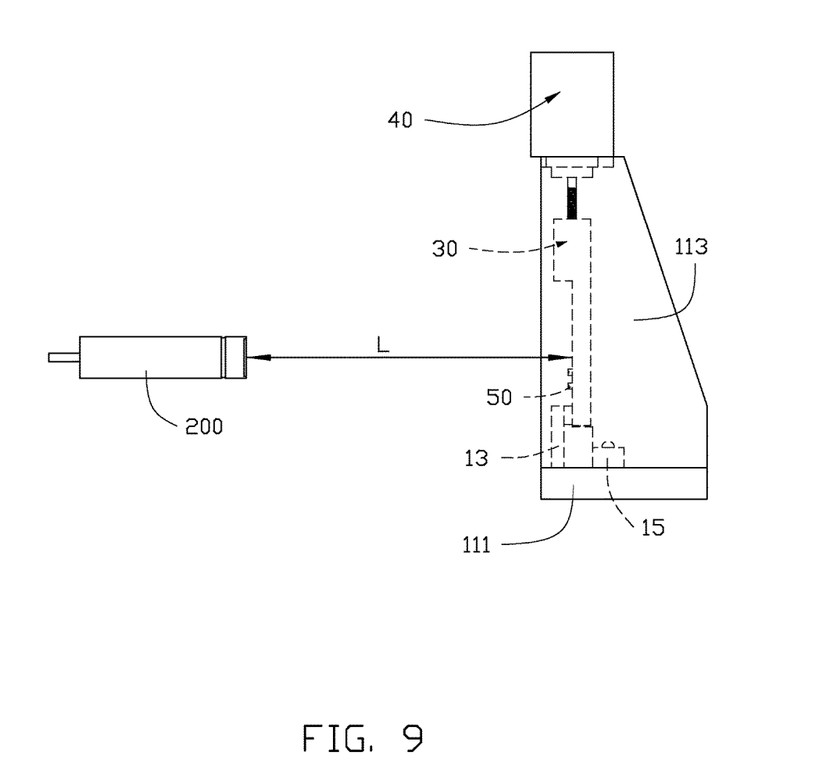
FIG. 9 is a side view of the calibration device of FIG. 1.

FIG. 7 shows the signal processing module of the microprocessor of FIG. 1. The microprocessor 70 comprises a storage unit 71, a counting; unit 73, a computing unit 75, and a control unit 77. FIG. 8 is a front view of the calibration device 100. FIG. 9 is a side view of the calibration device 100. Data as to the perpendicular distance L between the light output hole 201 of the laser level gauge 200 and two sliding members 30, the perpendicular distance V between the two sliding members 30, the height gap ha0 between one of the photo sensing member 50 and the central point of the light output hole 201 of the laser level gauge 200, the height gap hb0 between the other photo sensing member 50 and the central point of the light output hole 201 of the laser level gauge 200 together with the moving distance of sliding member 30 is stored in the storage unit 71. The counting, unit 73 records the pulse signals which are transmitted by two I/O terminals 701 of the microprocessor 70. In at least one embodiment, at the initial state, the two photo sensing members 50 are lower than the central point of the light output hole 201 of the laser level gauge 200.

Figure 10:
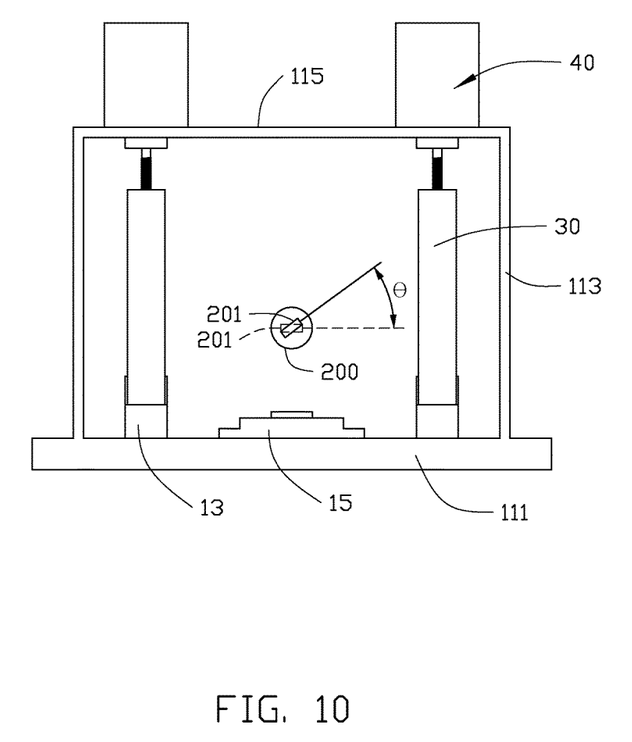
FIG. 10 is a front view of the rotation of laser level gauge of the calibration device of FIG. 1.
Figure 11:
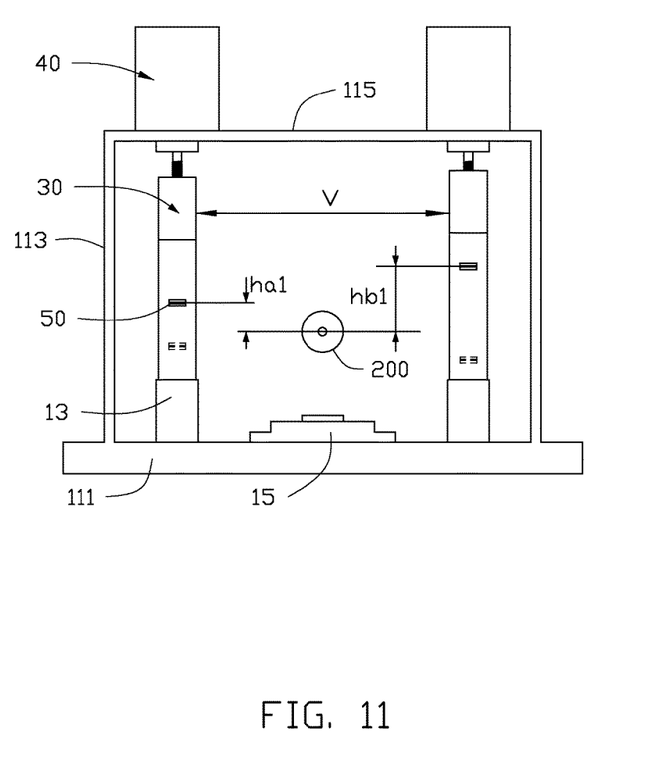
FIG. 11 is a front view of the calibration device of FIG. 1 in use.
Figure 12:
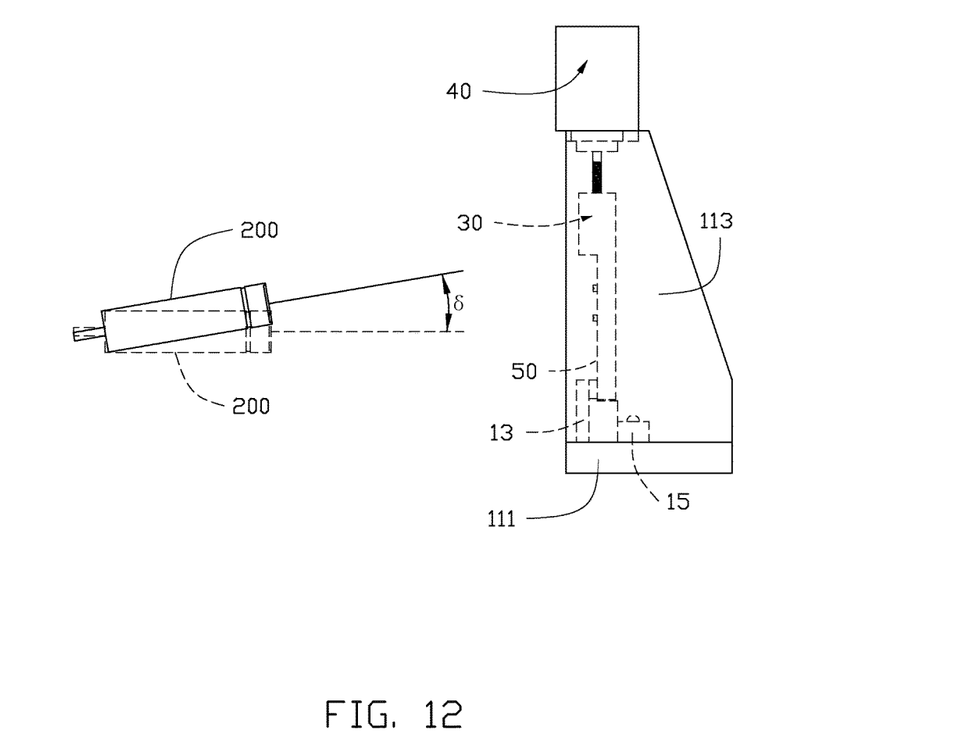
FIG. 12 is a side view of the calibration device of FIG. 1 while the laser level gauge is being adjusted.

FIG. 10 shows the laser level gauge rotating. FIG. 11 shows the calibration device 100 in use. Based on the number of pulse signals recorded in the counting unit 73 and the moving distance of sliding member 30 when the microprocessor 70 transmits pulse signals to drive the driven member 40 to make the sliding member 30 slide, stored in the storage unit 71, the computing unit 75 calculates two sliding distances ha1 and hb1, relevant to the two sliding members 30 sliding on the drive rod 43. FIG. 12 is a side view of the calibration device 100 raised. The computing unit 75 further calculates the declination of the mounted laser level gauge 200 relative to the horizontal plane. Relative to the horizontal plane, the laser level gauge 200 has a first declination θ and a second declination δ. In at least one embodiment, the first declination θ is the angle between the light output hole 201 of the laser level gauge 200 and the horizontal plane. The first declination θ can be expressed by the equation θ=[(ha1−ha0)−(hb1−hb0)]/V. The second declination δ is the angle between the central axis of the light output hole 201 of the laser level gauge 200 and the horizontal plane. The second declination can be expressed by the equation δ=[(ha1−ha0)+(hb1−hb0)]2L. The correspondence between the calculating equation of the first declination θ and of the second declination δ are stored in the computing unit 75. The control unit 77 controls the regulating member 60 to adjust the laser level gauge 200, based on the first declination θ and the second declination δ, as calculated by the computing unit 75.

Referring to FIG. 4 and FIG. 5, the extruded parts 33 of the two sliding members 30 are received in the vias 131. The resistant surface 311 of each sliding member 30 bears against the two locking surfaces 1351. Two photo sensing members 50 are configured on the sides of the sliding members 30 which are facing the laser level gauge 200. The drive rod 43 of each driven member 40 is engaged with the screw thread hole 351 of the sliding member 30. In one embodiment, the regulating member 60 can be mounted on a robot and connected with the laser level gauge 200. The microprocessor 70 is near the retaining rack 10, and connected with the photo sensing member 50, the driven member 40, and the regulating member 60.

Referring to FIG. 1, the laser level gauge 200 transmits laser light when the calibration device 100 is turned on, and the microprocessor 70 drives the driven main body 41 of the driven member 40 by the pulse signals through the I/O terminal 701, triggering the drive rod 43 to rotate. The sliding member 30 slides along the drive rod 43, therefore the photo sensing member 50 on the sliding member 30 rotates on the axis of the drive rod 43. While the photo sensing member 50 rotates, it senses the light intensity of the laser transmitted by the laser level gauge 200 and the signal of light intensity is transformed to an electrical signal and transferred to the microprocessor 70 after amplification by an amplifying circuit. The amplified signal is stored in the microprocessor 70. In the meantime, the numbers of pulses outputted by the I/O terminal 701 to the two driven members 40 are counted. The photo sensing member 50 keeps rotating unfit it cannot sense any laser light transmitted by the laser level gauge 200. The particular pulse signal transmitted from the I/O terminal 701 of the microprocessor 700 at the position at which the strongest light intensity of the laser, as sensed by the photo sensing member 50, is transmitted to the computing cant 75. The computing unit 75 calculates the moving distances ha1 and hb1 of which the two sliding members 30 moving along the drive rod 43. Then, based on the ha0, bb0 V, and L data stored in the storage unit 71, the computing unit 75 calculates the first declination θ and the second declination δ. The control unit 77 adjusts the laser level gauge 200 based on the calculated first declination θ and the calculated second declination δ. The above mentioned processes are repeated until the θ and δ calculated by the computing unit 75 are zero which means that the laser level gauge 200 is horizontal with the ground.

In at least one embodiment, the laser light transmitted by the laser level gauge 200 is detected by the two photo sensing members 50, and the signal of the light intensity is transformed to an electrical signal. The electrical signal is used to calculate the first declination θ and the second declination δ by the microprocessor 70. Then the control unit 77 controls the regulating member 60 to adjust the laser level gauge 200 until the laser level gauge 200 is horizontal with the ground. In at least one embodiment, the first declination θ and the second declination δ of the laser level gauge 200 can be precisely detected and precisely adjusted by the calibration device 100, thereby the precision of the calibration process can be improved.

The laser level gauge 200 can be other emitting element, as long as the emitting element can emit a fan-shaped light beam.

In other embodiments, the two supporting plates 113 are not limited to being perpendicularly configured on the mounting plate 111, nor limited to being parallel with each other. The two supporting plates 113 are configured on the same side of the mounting plate 111, and the mounting plate 111, the two supporting plates 113 and the anchor plate 115 form a quadrilateral frame.

In other embodiments, if the two photo sensing members 50 are parallel with the central point of the light output hole 201 at the initial state, i.e. the first declination θ=(ha1−hb1)/V and the second declination δ=(ha1+hb1)/2L, the storage unit 71 does not need to store-data as to the ha0 and hb0.

At the initial state, if the two photo sensing members 50 are above the central point of the light output hole 201 of the laser level gauge 200, the first declination θ is [(ha1−ha0)−(hb1−hb0)]/V and the second declination is δ is [(ha1+ha0)+(hb1+hb0)]/2L.

In other embodiment, the driven lever 40 is a gas cylinder, and the counting unit 73. may not be necessary. The photo sensing members are on the driven end of the gas cylinder, and a discharge sensor is electrically connected with the microprocessor 70. The discharge sensor is configured on a vent valve of the gas cylinder. Data as to a volume of the gas and the corresponding moving distance of the driven end of the gas cylinder is stored in the storage unit 71. The discharge sensor detects the volume of the gas passing the vent valve and transmits it to the microprocessor 70, and the computing unit 75 of the microprocessor 70 calculates the first declination and the second declination based on the moving distance and the other data stored in the storage unit 71.

In another embodiment, the driven member 40 can be a linear motor. A motion sensor connected with microprocessor is on the linear motor therefore the counting unit 73 of the microprocessor 70 may not be necessary. The photo sensing members 50 are configured on the driven end of the linear motor, and the linear motor drives the photo sensing member 50 to move linearly. When the linear motor carrying the photo sensing members 50 moves, the motion sensor obtains the moving distances of the linear motors, and transmits the data to the microprocessor 70. Then the computing unit 75 of the microprocessor 70 can calculate the first declination and the second declination of the laser level gauge 200 accordingly.

The embodiments shown and described above are only examples. Many details are often found in the art such as the other features of a calibration device. Therefore any such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the fall extent established by the broad general meaning of the terms used in the claims. It will therefore be appreciated that the embodiments described above may be modified within the scope of the claims.

What is claimed is:

1. A calibration device for calibrating a light emitting element with a light output hole to be horizontal with ground, the calibration device comprising:
a retaining rack;
a microprocessor;
a regulating member coupled to the microprocessor and the light emitting element;
two driven members connected to the retaining rack and coupled to the microprocessor and;
two photo sensing members coupled to the microprocessor;
wherein the microprocessor controls the driven member to move the corresponding photosensing member linearly, each photo sensing member configured to sense light transmitted by the light emitting element, data of the vertical distance between two driven members and vertical distance between the light emitting element and two driven members stored in the microprocessor, the microprocessor configured to calculate a moving distance of the photo sensing member on the corresponding driven member base on the light signal detected by the photo sensing member, the microprocessor further configured to calculate the declination of the light emitting element relative to the horizontal plane base on the vertical distance between two driven members and the vertical distance between the light emitting element and two driven members which are storage in the microprocessor, the microprocessor further configured to control the regulating member to adjust declination of the light emitting element relative to the horizontal plane.

2. The calibration device of claim 1, wherein the microprocessor comprises: a storage unit, a computing unit, and a control unit, wherein the vertical distance between two driven members and the vertical distance between the light emitting element and two driven members are storage in the storage unit, and the computing unit calculates the moving distance of the photo sensing member on the corresponding driven, member base on the light signal detected b the photo sensing member, and further calculates the declination of the light emitting element relative to the horizontal plane base on the vertical distance between two driven members and the vertical distance between the tight emitting element and two driven members which are storage in the microprocessor, and the control unit controls the regulating member to adjust the declination of the light emitting element relative to the horizontal plane.

3. The calibration device of claim 2, wherein the computing unit of the microprocessor calculates a first declination of the light emitting element relative to the horizontal plane, base on the moving distance of each photo sensing member on the corresponding driven member and the vertical distance between two driven members.

4. The calibration device of claim 2, wherein a plane formed by two photo sensing members and the central point of the light output hole of the light emitting element is parallel with horizontal plane at the initial state, and the computing unit of the microprocessor calculates a second declination of the light emitting element relative to the horizontal plane, base on the moving distance of each photo sensing member on the corresponding driven member and the vertical distance between the light emitting element and two driven members.

5. The calibration device of claim 2 wherein the plane formed by two photo sensing members and the central point of the light output hole are cross with the horizontal plane at the initial state, and height gap between each photo sensing member and the central point of the light output hole of the light emitting element are storage in the storage unit of the microprocessor; and the computing unit of the microprocessor calculates the second declination of the light emitting element relative to the horizontal plane, base on the moving distance of each photo sensing member on the corresponding driven member, the height gap between each photo sensing member and the central point of the light output hole and the vertical distance of two driven members.

6. The calibration device of claim 2, wherein the calibration device further comprises two sliding members which are configured on the retaining rack, two sliding members are screwed with a driven lever of the corresponding driven member, and two photo sensing member are configured on the side facing the light emitting element of the sliding member; and the microprocessor further comprises a counting unit, the microprocessor transmits pulse signals to each driven member and controls the driven member to trigger the sliding member slide with photo sensing member, a moving distance of the sliding member when the microprocessor transmits a pulse signal are storage in the storage unit, and the counting unit records the numbers of the pulse signal and the computing unit calculates the moving distance of the sliding member.

7. The calibration device of claim 6, wherein the retaining rack comprises at last one retaining member and at last one locking member which is configured on the retaining member, a via is defined on each locking member, and each locking member has locking surfaces, each sliding member has resistant surface, the resistant surface faces the light emitting element, one end of each sliding member is received in the via, the resistant surface of each sliding member bears against the locking surface.

8. A calibration method frit calibrating a light emitting element with a light output hole to be horizontal with ground, comprises the following steps:
 a microprocessor controls two driven members to bring a corresponding photo sensing member to move;
 each photo sensing member detect the light transmitted by the light emitting element;
 the microprocessor calculate a moving distance of each photo sensing member on the corresponding driven member base on a light signal detected by the photo sensing member;
 the microprocessor calculates a declination of the light emitting element relative the horizontal plane base on the moving distance of the photo sensing member on the corresponding driven member and a vertical distance between two driven members and a vertical distance between the light emitting element and the two driven members which are storage in the microprocessor;
 the microprocessor controls a regulating member to adjust the declination of the light emitting element relative to the horizontal plane.

9. The calibration method of claim 8, wherein the light emitting element has two declinations relative to the horizontal plane, includes, a first declination and a second declination; the microprocessor comprises a storage unit, a computing unit and a control unit, the vertical distance between two driven members and the vertical distance between the light emitting element and two driven members are storage in the storage unit; the computing unit calculates the moving distance of each photo sensing member on the corresponding driven member, and further combine the vertical distance between the two driven members and the vertical distance between the light emitting element and two driven members which are storage in the storage unit to calculate the declination of the light emitting element relative to the horizontal plane; the control unit controls the regulating member to adjust the light emitting element base on the first declination and the second declination.

10. The calibration method of claim 9, wherein the microprocessor transmits pulse signals to each driven member, and controls the driven member to trigger the photo sensing member move; a moving distance of the photo sensing member when the microprocessor transmits a pulse signal is storage in the storage unit; the microprocessor further comprises a counting unit which is used to record the number of the pulse signal transmitted by the microprocessor to calculate the moving distance of each photo sensing member by the computing unit of the microprocessor.

* * * * *